US012340132B2

(12) United States Patent
Van Vliembergen et al.

(10) Patent No.: US 12,340,132 B2
(45) Date of Patent: Jun. 24, 2025

(54) METHOD FOR QUEUEING PRINT JOBS TO BE PRINTED ON RIGID PRINT MEDIA

(71) Applicant: Canon Production Printing Holding B.V., Venlo (NL)

(72) Inventors: Eduardus J. W. Van Vliembergen, Venlo (NL); Martinus G. M. Lange, Venlo (NL)

(73) Assignee: CANON PRODUCTION PRINTING HOLDING B. V., Venlo (NL)

( * ) Notice: Subject to any disclaimer, the term of this patent is extended or adjusted under 35 U.S.C. 154(b) by 105 days.

(21) Appl. No.: 18/511,504

(22) Filed: Nov. 16, 2023

(65) Prior Publication Data

US 2024/0176563 A1    May 30, 2024

(30) Foreign Application Priority Data

Nov. 30, 2022  (EP) .................................... 22210443

(51) Int. Cl.
G06F 3/12  (2006.01)
(52) U.S. Cl.
CPC ............ *G06F 3/124* (2013.01); *G06F 3/1205* (2013.01); *G06F 3/1256* (2013.01); *G06F 3/1263* (2013.01); *G06F 3/1279* (2013.01)
(58) Field of Classification Search
CPC ...... G06F 3/124; G06F 3/1205; G06F 3/1256; G06F 3/1263; G06F 3/1279; B41J 11/0055
See application file for complete search history.

(56) References Cited

U.S. PATENT DOCUMENTS

2004/0017456 A1   1/2004  Obertegger et al.
2009/0007811 A1*  1/2009  Weingartner ............ B41J 3/407
                                                  101/483

(Continued)

FOREIGN PATENT DOCUMENTS

CN    203449761 U    2/2014
CN    216033298 U    3/2022
ES    2 547 473 A1  10/2015

OTHER PUBLICATIONS

European Search Report of application No. 22 21 0443 dated May 12, 2023.

*Primary Examiner* — John R Wallace
(74) *Attorney, Agent, or Firm* — Birch, Stewart, Kolasch & Birch, LLP

(57) ABSTRACT

A method for a printer including a transport device including an endless transport belt supported on a pair of support rollers, which between them define a medium support plane, over which medium support plane a print station is provided. The method includes transporting in parallel a plurality of individual print media perpendicular to a scanning direction of the print station on the medium support plane, the print media having different dimensions; determining positions of the individual print media based on the determined positions; and jetting marking material for forming a designated image specific for each print medium on each respective print medium. The above steps are repeated such that print media are printed in a plurality of parallel lanes on the medium support plane perpendicular to the scanning direction. The printer is provided with a plurality of guiding bars extending in the transport direction and positioned at a side of at least one lane of the plurality of parallel lanes in order to guide the individual print media into one of the plurality of parallel lanes. The printer includes a print controller for controlling the print process for a digital image to be printed, (Continued)

the print controller including two print queues for receiving digital images to be printed by the printer. It is established if the digital image requires to be right aligned or left aligned along a guiding bar. In case of a required left alignment, the digital image is added to a first print queue of the two print queues. In case of a required right alignment, the digital image is added to a second print queue of the two print queues.

12 Claims, 12 Drawing Sheets

(56) References Cited

U.S. PATENT DOCUMENTS

2009/0303266 A1   12/2009  Baker et al.
2017/0217167 A1*  8/2017  Rabin ..................... B41J 11/48

* cited by examiner

METHOD FOR QUEUEING PRINT JOBS TO BE PRINTED ON RIGID PRINT MEDIA

BACKGROUND OF THE INVENTION

1. Field of the Invention

The present invention relates to a method for a printer comprising a transport device comprising an endless transport belt supported on a pair of support rollers, which between them define a medium support plane, over which medium support plane a print station is provided, wherein the method comprises the steps of transporting in parallel a plurality of individual print media perpendicular to a scanning direction of the print station on the medium support plane, the print media having different dimensions; determining positions of the individual print media; based on the determined positions, jetting marking material for forming a designated image specific for each print medium on each respective print medium, wherein the above steps are repeated such that print media are printed in a plurality of parallel lanes on the medium support plane perpendicular to the scanning direction, and wherein the printer is provided with a plurality of guiding bars extending in the transport direction and positioned at a side of at least one lane of the plurality of parallel lanes in order to guide the individual print media into one of the plurality of parallel lanes.

The invention also relates to a printer—specifically a large format hybrid printer—, which comprises a print controller which is configured to execute the steps of the method according to the present invention.

The media support plane may also be called "table" hereinafter.

A rigid print medium may also be called "rigid", "board" or "rigid board".

The print medium may also be called "print media" or "print media piece".

A guiding bar may also be called an alignment bar.

2. Description of Background Art

Large format hybrid printers are configured to print both rigid substrates as well as flexible print media. Such a printer may comprise a transport device comprising an endless transport belt supported on at least one pair of support rollers, which between them define a medium support plane. Over the medium support plane a print station is provided. The print station generally comprises a printhead carriage translatable over the belt to print an image on a print medium on the belt in consecutive swaths. The print medium is moved in steps in between passes of the printhead carriage.

A large format hybrid printer is intended to be a productive engine capable of printing both on roll-2-roll media and on rigids. To be productive on rigids the printer is equipped with a multilane concept. With this, multiple rigids can be printed in parallel next to each other. The multilane concept increases productivity since there will be less "turn time" for the print station compared to "jetting time".

In order to enhance an overall productivity and to reduce operator hassle the printer supports the feature of independent board feeding, i.e. the print medium does not need to be aligned in the transport direction. The print medium has to be placed against one of the guiding bars to achieve a fluent transport in an appropriate lane.

However, when there is one print queue it is difficult to decide in which lane to place the print medium for which print job. On the other hand, if there are multiple lanes and there is one print queue for each lane, the operator has to monitor many queues and easily loses the overview and control over the input of print media. Moreover, showing an overview of for example 6 queues on a user interface of the printer is cumbersome or even impossible. Another disadvantage is that the operator has to submit print jobs to many queues which will result in a need of load balancing. However, load balancing will result in a loss of the flexibility that the operator can load a rigid in each free lane. Having multiple queues with print jobs that can have different print modes will become very complex to understand. Having queues with different print jobs and different rigid sizes makes it also very complex for the operator to keep track of which media to feed at what time.

SUMMARY OF THE INVENTION

It is an object of the invention to provide a printer with an improved ease of use of the lanes.

In accordance with the present invention, a method for printing according to claim 1 is provided.

To support an operator in making optimal use of the multi-lane concept, two queues are created. The operator uses two queues, one queue for images on print media that are intended to be left aligned along a guiding bar, and one queue for images on print media that are intended to be right aligned along a guiding bar. When an image has reached the top of the first print queue or the second print queue, i.e. the image is the first one in the first print queue or the second print queue, the image is ready to be printed on left aligned print media respectively right aligned print media.

Depending on the customer application the alignment of the rigid board is important for printing on rigids. For example, double sided printing on boards may oblige to ensure to use a same edge of the board to align on when printing a front side and a back side of the board, i.e. all front sides of the boards may be left aligned, while all back sides of the boards may be right aligned.

Another example of the importance of aligning relates to a post-processing step also known as a finishing step after printing on the boards. To support optimal finishing, it is ensured that all boards are printed on with a same alignment edge.

According to an embodiment the method comprises the steps of, in case of a presence of the digital image in the first queue, receiving print media which is left aligned along a guiding bar and printing the digital image on left aligned print media, and, in case of a presence of the digital image in the second queue, receiving print media which is right aligned along a guiding bar and printing the digital image on right aligned print media.

According to an embodiment the printer comprises above each lane a signaling object which is activated when the corresponding lane is enabled to receive print media, and the method comprises the steps of determining if the next image to be printed resides in the first queue or in the second queue, in case of a residence in the first queue, activating the signaling object of each lane for which the print media requires to be left aligned and deactivating the signaling object of each lane for which the print media requires to be right aligned, and in case of a residence in the second queue, activating the signaling object of each lane for which the print media requires to be right aligned and deactivating the signaling object of each lane for which the print media requires to be left aligned.

According to an embodiment the digital image to be printed is comprised in a print job having a plurality of print job attributes comprising a print job attribute for a required alignment, and the step of establishing if the digital image requires to be right aligned or left aligned along a guiding bar, comprises the sub-step of taking the print job attribute for the required alignment into account. The print job attribute may be a left alignment, a right alignment or a "don't care" alignment. The print controller may read out the print job attribute from the print job and automatically place the digital image of the print job in the first print queue in case of a required left alignment or in the second print queue in case of a required right alignment. In case of a "don't care" alignment, the digital image may arbitrarily be placed in one of the two print queues or for example in the print queue which is shortest in planned time for the images which are already placed in said print queue.

According to an embodiment the printer comprises a user interface and the method comprises the step of displaying the two queues on a screen of the user interface.

According to an embodiment the user interface comprises a waiting room comprising images to be selected for printing, and the method comprises the steps of selecting an image in the waiting room and moving or copying the selected image to one of the two queues on the screen of the user interface.

According to an embodiment the method comprises the step of blocking one of the print queues due to at least one print situation out of a group of print situations comprising a first situation that a rigid is broader than a lane width, a second situation having images to be printed with different print modes, a third situation of the introduction of new print media and a fourth situation of having print media of different thicknesses. When a print queue is blocked, no images and/or print jobs can be added to the print queue. A print mode may be defined by a number of passes the print station makes in order to create a complete swath of marking material on the print media. In case of new print medium, the properties of the new print medium have to be entered in a media management module of the printer. In case of different thicknesses of the print media, the print head height above the medium support plane has to be adjusted and images of different thicknesses cannot be printed simultaneously in different lanes.

The present invention also relates to a printer comprising a transport device comprising an endless transport belt supported on a pair of support rollers, which between them define a medium support plane, over which medium support plane a print station is provided, wherein the printer is provided with a plurality of guiding bars extending in the transport direction and positioned at a side of at least one lane of the plurality of parallel lanes in order to guide the individual print media into one of the plurality of parallel lanes, the printer comprises a print controller for controlling the print process for digital images to be printed by means of two print queues for receiving digital images to be printed by the printer, and the print controller is configured to execute the steps of a method according to the present invention.

According to an embodiment the printer comprises above each lane a signaling object which is activated when the corresponding lane is enabled to receive print media, and the print controller is configured to execute the steps of a method according to the present invention.

According to an embodiment the printer comprises a user interface for displaying the two print queues comprising digital images to be printed by the printer.

According to an embodiment the printer is a hybrid printer for printing on rigid print media as well as on flexible print media.

The present invention also relates to a software product comprising program code on a machine-readable medium, which program code, when loaded into a print controller of a digital printer according to the present invention, causes the print controller to execute the steps of the method according to the present invention.

Further scope of applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

Figure 8:
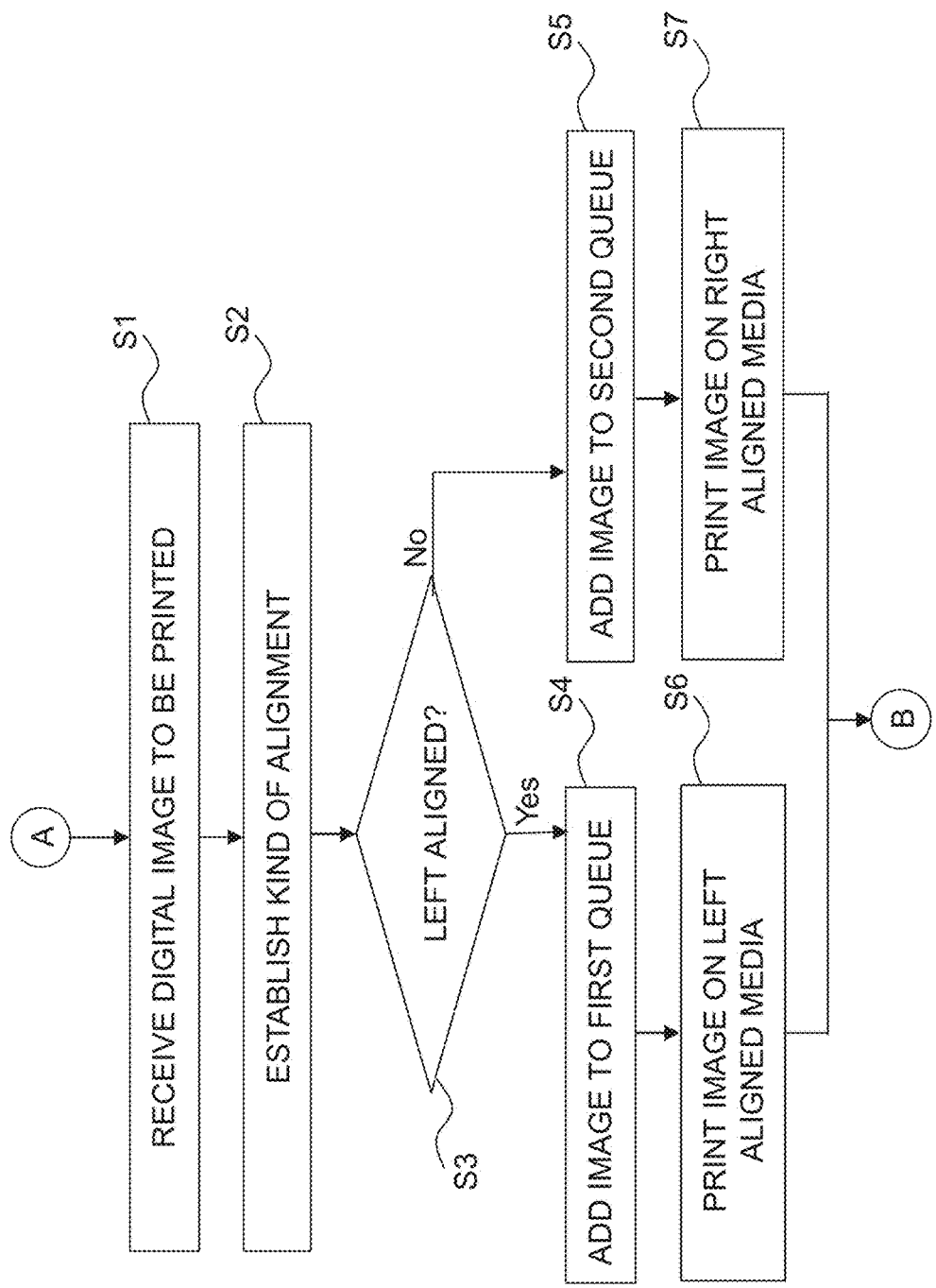
Figure 9:
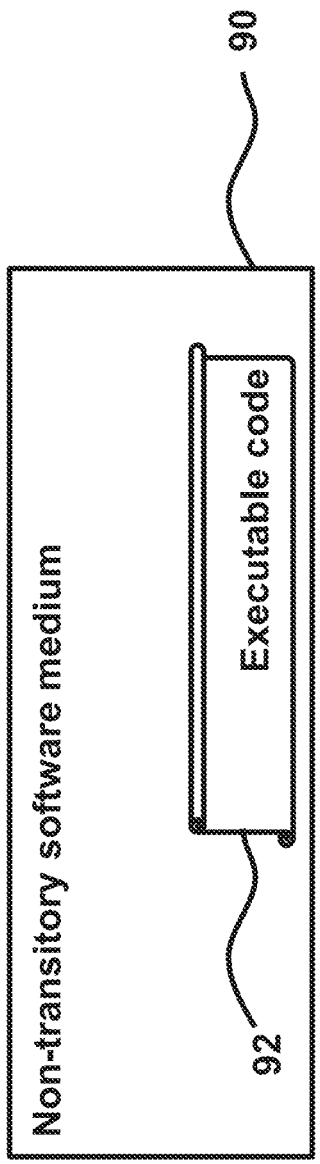

FIG. 8 a schematic block diagram illustrating the steps of a method according to the present invention; and FIG. 9. is a diagram of a software product according to the present invention.

DETAILED DESCRIPTION OF THE PREFERRED EMBODIMENTS

The present invention will now be described with reference to the accompanying drawings, wherein the same reference numerals have been used to identify the same or similar elements throughout the several views.

Printing System

Figure 1:
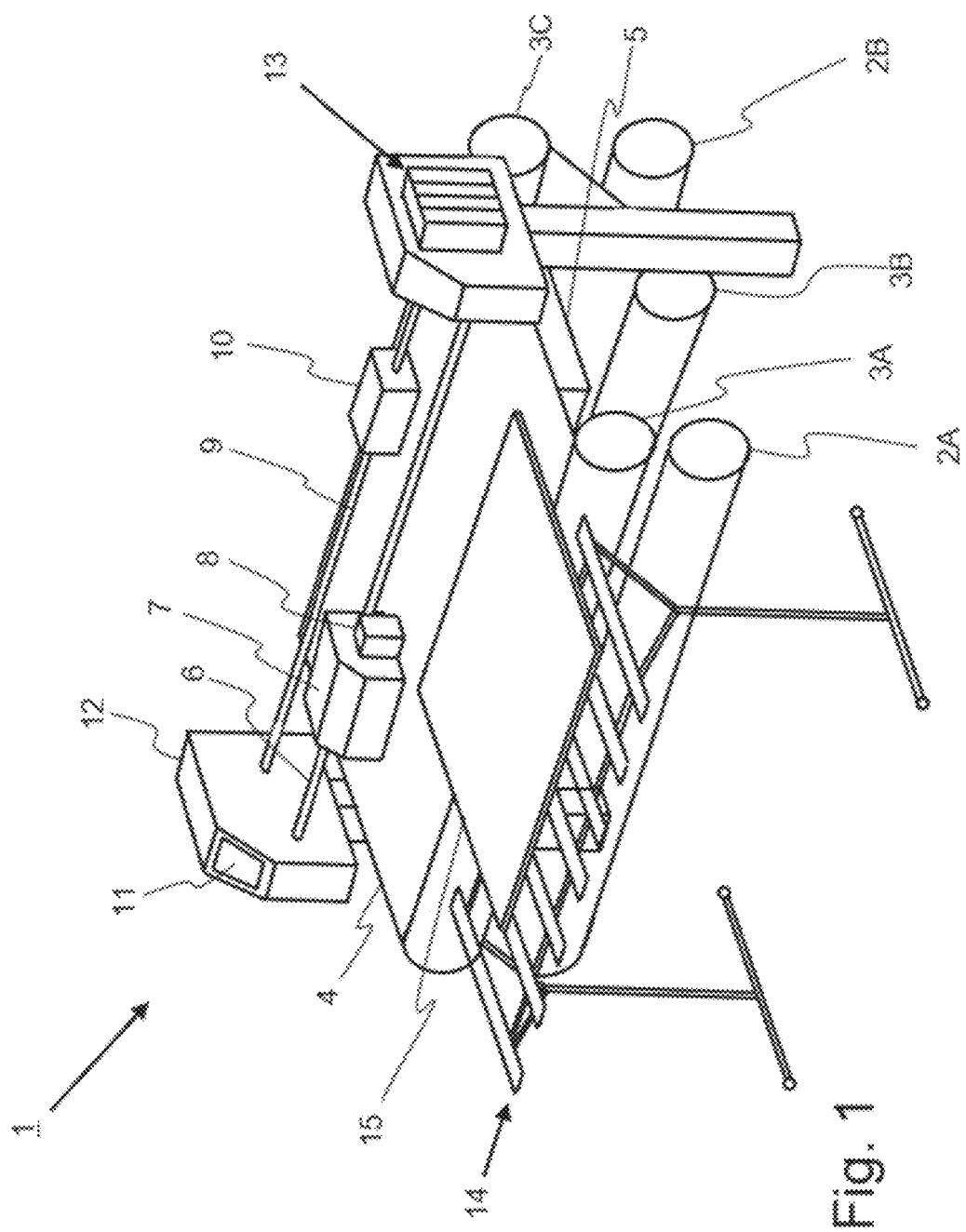
FIG. 1 is a schematic perspective view of a printing system configured to print on rigids according to the present invention.

FIG. 1 shows a wide format inkjet printer 1. The wide-format printer 1 comprises an inkjet printing assembly 7 for printing on a print medium 15. The print medium 15 in FIG. 1 is a relatively rigid substrate, such as a panel. The print medium 15 is supplied from a media input unit 14, which may be configured for storing a plurality of such print media 15 and supplying these to the printer 1. The printer 1 comprises transport means for receiving and transporting the print medium 15 along the inkjet printing assembly 7. In FIG. 1, the transport means comprise an endless transport belt 4 supported on a plurality of support rollers 3A, 3B, 3C. At least one of the support rollers 3A, 3B, 3C is provided with driving means for moving the belt 4. Additionally, one or more one of the support rollers 3A, 3B, 3C may be configured to be moved and/or tilted to adjust and control the lateral position of the belt 4. The printer 1 is provided with at least one sensor or detector, such as a CCD camera or area camera, to determine the relative position of belt 4 and/or the print medium 15. Data from said at least one sensor or detector may be applied to control the position of the belt 4 and/or the print medium 15. The at least one sensor or detector is positioned in or at a housing (not shown) of the printer 1 and is configured to detect the print medium 15 before transporting the print medium 15 or before the print medium reaches the print station 7. By using cameras the print medium 15 can be detected over a full width of the medium support plane, and before the print station 7 will start printing on the print medium 15. The at least one sensor or detector can also sense or see alignment bars (not shown) positioned on the media input unit 14 extending towards the medium support plane. According to an alternative embodiment the at least one sensor or detector is integrated in the medium support plane.

The belt 4 is further provided with through-holes and a suction box 5 in connection with a suction source (not shown), such that a negative pressure may be applied to the print medium 15 via the through-holes in the belt 4. The negative pressure adheres the print medium 15 flatly to the belt 4 and prevents displacement of the print medium 15 with respect to the belt 4. Due to this holding the belt 4 is able to transport the print medium 15. It will be appreciated that other suitable transport means, such as rollers, steppers, etc., may alternatively be applied. The print medium 15 may be transported stepwise and/or in continuous movement.

The inkjet printing assembly 7 is configured to translate along a first guide beam 6 in a scanning direction. The scanning direction is perpendicular to the direction in which the print medium is transported by the belt 4. The inkjet printing assembly 7 holds a plurality of print heads (not shown), which are configured to jet a plurality of different marking materials (different colors of ink, primers, coatings, etc.) on the print medium 15. Each marking material for use in the printing assembly 7 is stored in one of a plurality of containers arranged in fluid connection with the respective print heads for supplying marking material to said print heads to print an image on the print medium 15.

The ejection of the marking material from the print heads is performed in accordance with data provided in the respective print job. The timing by which the droplets of marking material are released from the print heads determines their position on the print medium 15. The timing may be adjusted based on the position of the inkjet printing assembly 7 along the first guide beam 6. The above mentioned sensor 8 may therein be applied to determine the relative position and/or velocity of the inkjet printing assembly 7 with respect to the print medium 15. Based upon data from the sensor 8, the release timing of the marking material may be adjusted.

Upon ejection of the marking material, some marking material may be spilled and stay on a nozzle surface of the print heads. The marking material present on the nozzle surface, may negatively influence the ejection of droplets and the placement of these droplets on the print medium 15. Therefore, it may be advantageous to remove excess of marking material from the nozzle surface. The excess of marking material may be removed for example by wiping with a wiper and/or by application of a suitable anti-wetting property of the surface, e.g. provided by a coating.

The marking materials may require treatment to properly fixate them on the print medium. Thereto, a fixation unit 10 is provided downstream of the inkjet printing assembly 7. The fixation unit 10 may emit heat and/or radiation to facilitate the marking material fixation process. In the example of FIG. 1, the fixation unit 10 is a radiation emitter, which emits light of certain frequencies, which interacts with the marking materials, for example UV light in case of UV-curable inks. The fixation unit 10 in FIG. 1 is translatable along a second guide beam 9. Other fixation units 10, such as page-wide curing or drying stations may also be applied. Further, the inkjet printing assembly 7 may be provided with a further fixation unit on the same carriage which holds the print heads. This further fixation unit can be used to (partially) cure and/or harden the marking materials, independent of or interaction with the fixation unit 10.

After printing, and optionally fixation, the print medium 15 is transported to a receiving unit (not shown). The receiving unit may comprise a take-up roller for winding up the print medium 15, a receiving tray for supporting sheets of print medium 15, or a rigid media handler, similar to the media input unit 14. Optionally, the receiving unit may comprise processing means for processing the medium 15 after printing, e.g. a post-treatment device such as a coater, a folder, a cutter, or a puncher.

The wide-format printer 1 furthermore comprises a user interface 11 for receiving print jobs and optionally for manipulating print jobs. The local user interface unit 11 is integrated to the print engine and may comprise a display unit and a control panel. Alternatively, the control panel may be integrated in the display unit, for example in the form of a touch-screen control panel. The local user interface unit 11 is connected to a control unit 12 connected to the printer 1. The control unit 12, for example a computer, comprises a processor adapted to issue commands to the printer 1, for example for controlling the print process. The printer 1 may optionally be connected to a network. The connection to the network can be via cable or wireless. The printer 1 may receive printing jobs via the network. Further, optionally, the control unit 12 of the printer 1 may be provided with an input port, such as a USB port, so printing jobs may be sent to the printer 1 via this input port.

Hybrid Printing System

Figure 2:
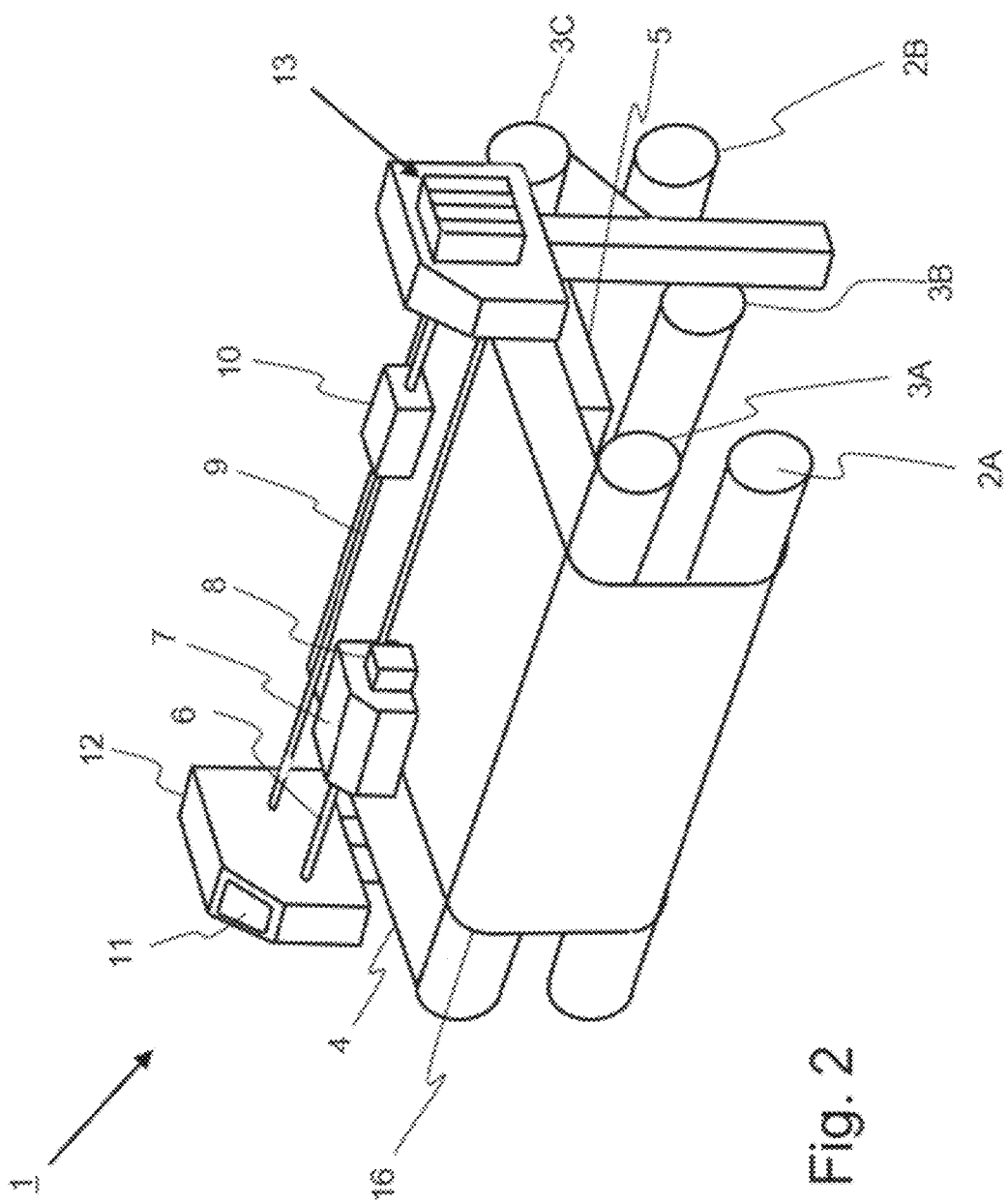
FIG. 2 is a schematic perspective view of a printing system in FIG. 1 configured to print on a roll of media according to the present invention.

The printer 1 in FIG. 1 is a so-called hybrid printer, capable of handling both flexible media and rigid substrates. In FIG. 1, the printer 1 operates in a first print situation, wherein the printer 1 is configured for transporting rigid substrates, such as the print medium 15. Such rigid print media 15 may be panels for doors, walls, etc., corrugated media, plates formed of plastic or metal, etc. To handle these rigid print media 15, the printer 1 in FIG. 1 is configured with a substantially linear transport path: from the media input device 14, the print medium 15 moves forward along the inkjet printing assembly 7 at a at substantially constant height. The media input unit 14 and the receiving unit are positioned at the level of the medium support surface of the belt 4. In FIG. 2, a flexible web medium 16 is supplied to the printer 1, which web medium 16 may be composed of e.g. paper, label stock, coated paper, plastic or textile. The web medium 16 is supplied from the input roller 2A and extends across the belt 4 to the take-up roller 2B, where the web medium 16 is re-wound. The printer 1 is configured to swiftly and efficiently switch between print modes.

Control

Figure 3:
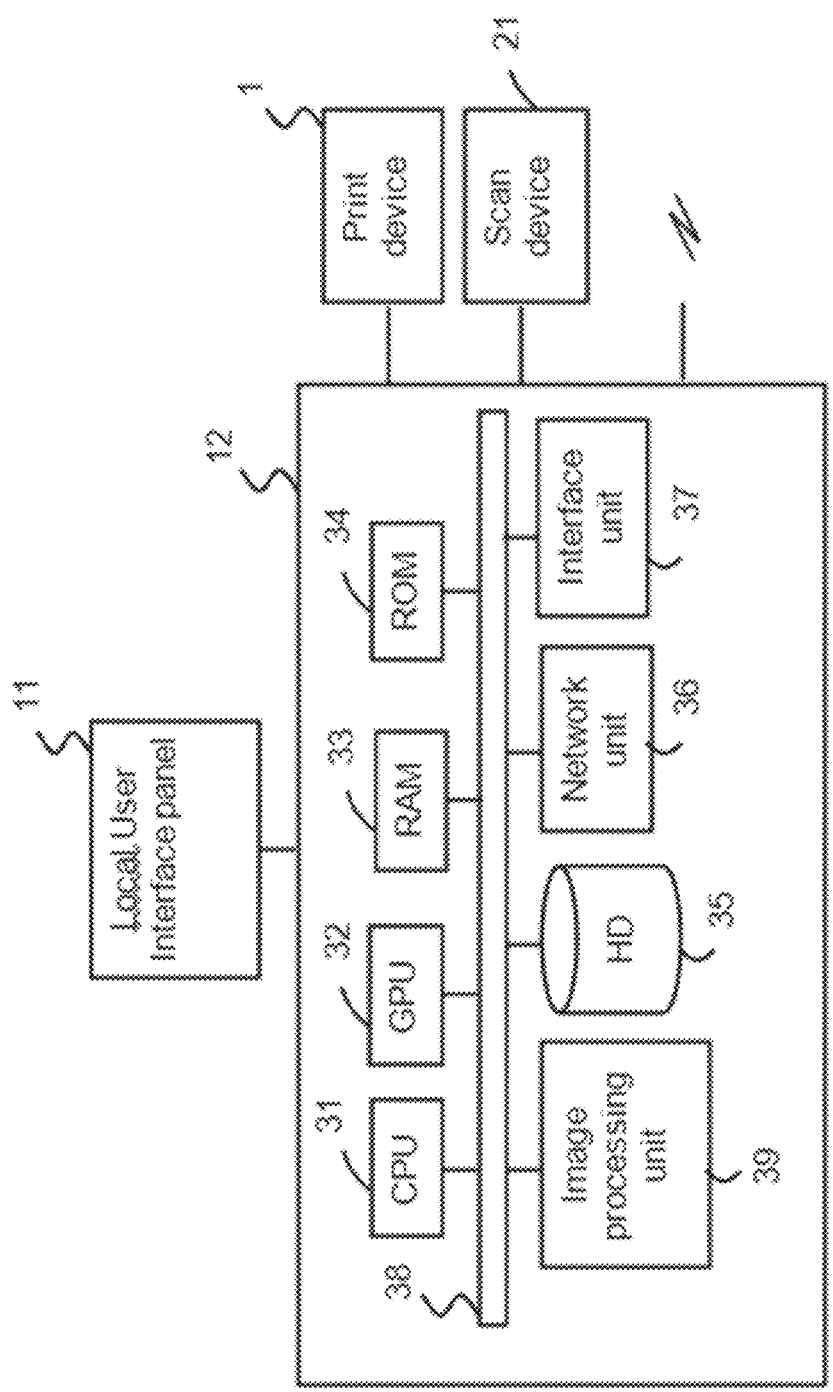
FIG. 3 is a schematic diagram of a control unit of a printer according to FIG. 1 or 2.

An embodiment of the control unit 12 is in more detail presented in FIG. 3. As shown in FIG. 3, the control unit 12 comprises a Central Processing Unit (CPU) 31, a Graphical Processor Unit (GPU) 32, a Random Access Memory (RAM) 33, a Read Only Memory (ROM) 34, a network unit 36, an interface unit 37, a hard disk (HD) 35 and an image processing unit 39 such as a Raster Image Processor (RIP). The aforementioned units 31-37 are interconnected through a bus system 38. However, the control unit 12 may also be a distributed control unit.

The CPU 31 controls the printing system 1 in accordance with control programs stored in the ROM 34 or on the HD 35 and the local user interface panel 11. The CPU 31 also controls the image processing unit 39 and the GPU 32. The ROM 34 stores programs and data such as boot program, set-up program, various set-up data or the like, which are to be read out and executed by the CPU 31. The hard disk 35 is an example of a non-volatile storage unit for storing and saving programs and data which make the CPU 31 execute a print process to be described later. The hard disk 35 also comprises an area for saving the data of externally submitted print jobs. The programs and data on the HD 35 are read out onto the RAM 33 by the CPU 31 as needed. The RAM 33 has an area for temporarily storing the programs and data read out from the ROM 34 and HD 35 by the CPU 31, and a work area which is used by the CPU 31 to execute various processes. The interface unit 37 connects the control unit 12 to the client device 21 and to the printing system 1. The network unit 36 connects the control unit 12 to the network N and is designed to provide communication with workstations and with other devices reachable via the network N. The image processing unit 39 may be implemented as a software component running on an operation system of the control unit 12 or as a firmware program, for example embodied in a field-programmable gate array (FPGA) or an application-specific integrated circuit (ASIC). The image processing unit 39 has functions for reading, interpreting and rasterizing the print job data. Said print job data contains image data to be printed (i.e. fonts and graphics that describe the content of the document to be printed, described in a Page Description Language or the like), image processing attributes and print settings.

Multi-Lanes Concept

Figure 4:
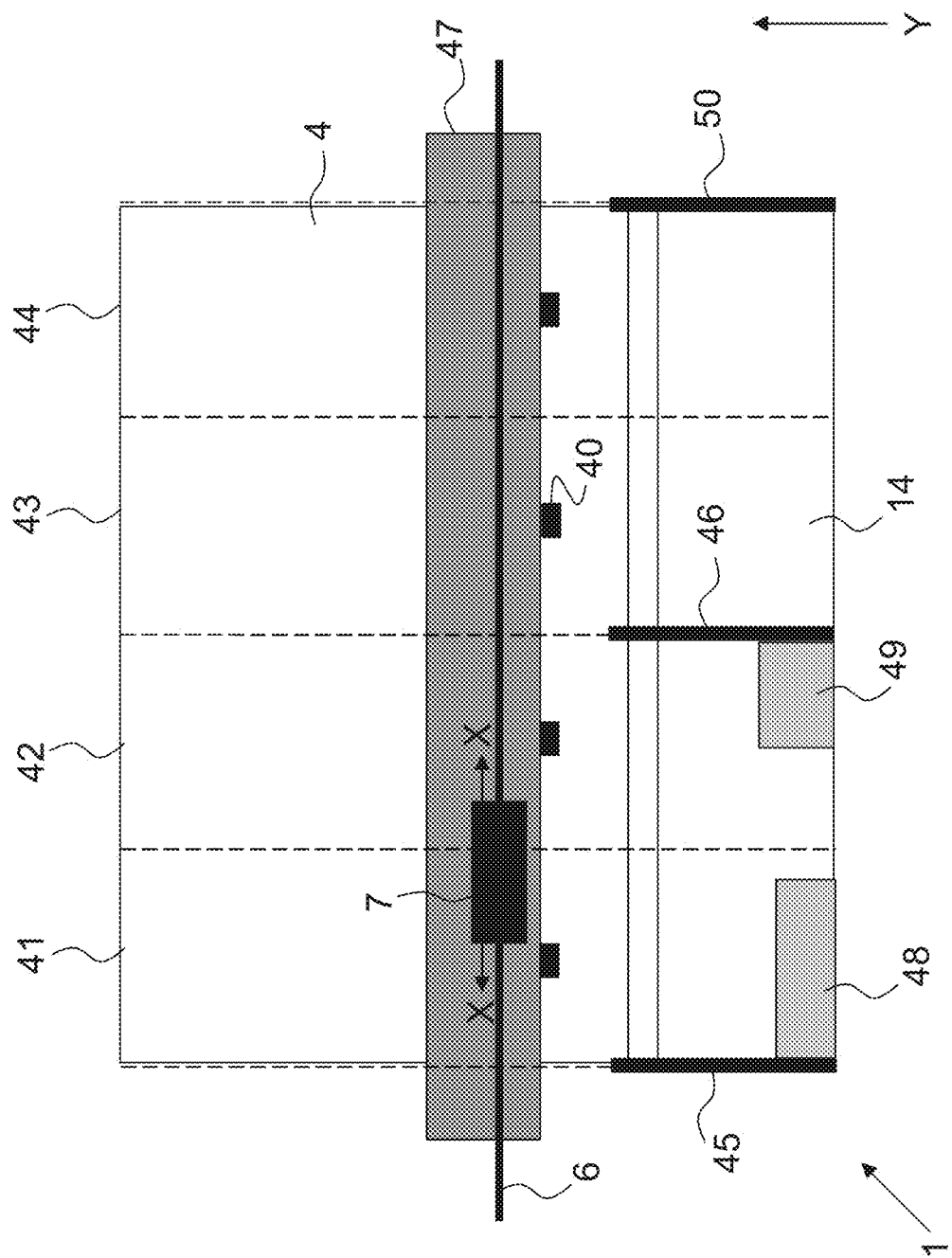
FIG. 4 is a schematic view of the media support plane of the printer according to FIG. 1.

FIG. 4 shows schematically the printer 1 seen from above provided with a multi-lane concept. The belt 4 is divided into lanes 41, 42, 43, 44 which are parallel in the transport direction Y of the print media on the media input unit 14 and the belt 4. In parallel a plurality of individual print media may be transported perpendicular to a scanning direction X of the print station 7 of the printer 1. The print media may have different dimensions. Positions of each individual print medium is determined. A designated image specific for each print medium is jetted on each respective print medium. The above steps are repeated such that print media are printed in parallel lanes 41, 42, 43, 44 perpendicular to the scanning direction.

In this example, four lanes 41, 42, 43, 44 are depicted. However, according to the invention the number of lanes may be in principle two or more lanes. A number of preferred configurations will be described hereinafter.

The position and the widths of the lanes 41, 42, 43, 44 on the belt 4 and the media input unit 14 are configurable via the user interface 11. Such a configuration is determined by the positions of one or more guiding bars 45, 46, 50.

The lanes 41, 42, 43, 44 are completely or partially bound by guiding bars 45, 46, 50 extending on the media input unit 14 towards the belt 4 in the transport direction Y of the belt 4.

The print media may be aligned by means of the guiding bars 45, 46, 50. A print media piece may be left aligned or right aligned. For example print media piece 48 is left aligned along guiding bar 45 and print media piece 49 is right aligned along guiding bar 46. The print media may have different sizes, i.e. different lengths and/or widths. A housing 47 above the belt 4 comprises a guiding rail 6 via which the print station 7 is able to travel in the scanning direction X. The housing 47 also comprises one or more sensors (not shown) which are substantially downward directed to the belt 4 for detecting a presence and a position of print media in the lanes 41-44. The housing 47 also comprises signaling objects 40 at the front side directed to the media input unit 14 for signaling if a lane is disabled or enabled or if a lane is available to receive print media to print the images of the current print job. A signaling object 40 is positioned above each of the defined lanes 41-44.

The signaling object 40 preferably is a LED lamp. The signaling object 40 may be deactivated when the lane is disabled or when in use but no media has to be fed at the moment because there are no print jobs in the print queue corresponding to the kind of alignment of the lane. Two kind of alignments of a lane are envisioned: a left alignment of a lane in which all fed print media are left aligned and a right alignment of a lane in which all fed print media are right aligned. The signaling object 40 may be activated when the lane is enabled. However, other ways of signaling in order to indicate that a lane is disabled or enabled may be envisioned within the scope of the present invention. The signaling object may have a green light when a print medium can be fed. Other colors can be used, e.g. a red color for an error at printing, or a color green blinking when a print medium can soon be fed.

If a particular lane is disabled, no marking material will be jetted downwards from the print station 7 when the print station is travelling over the particular lane in the scanning direction X.

Figure 5A:
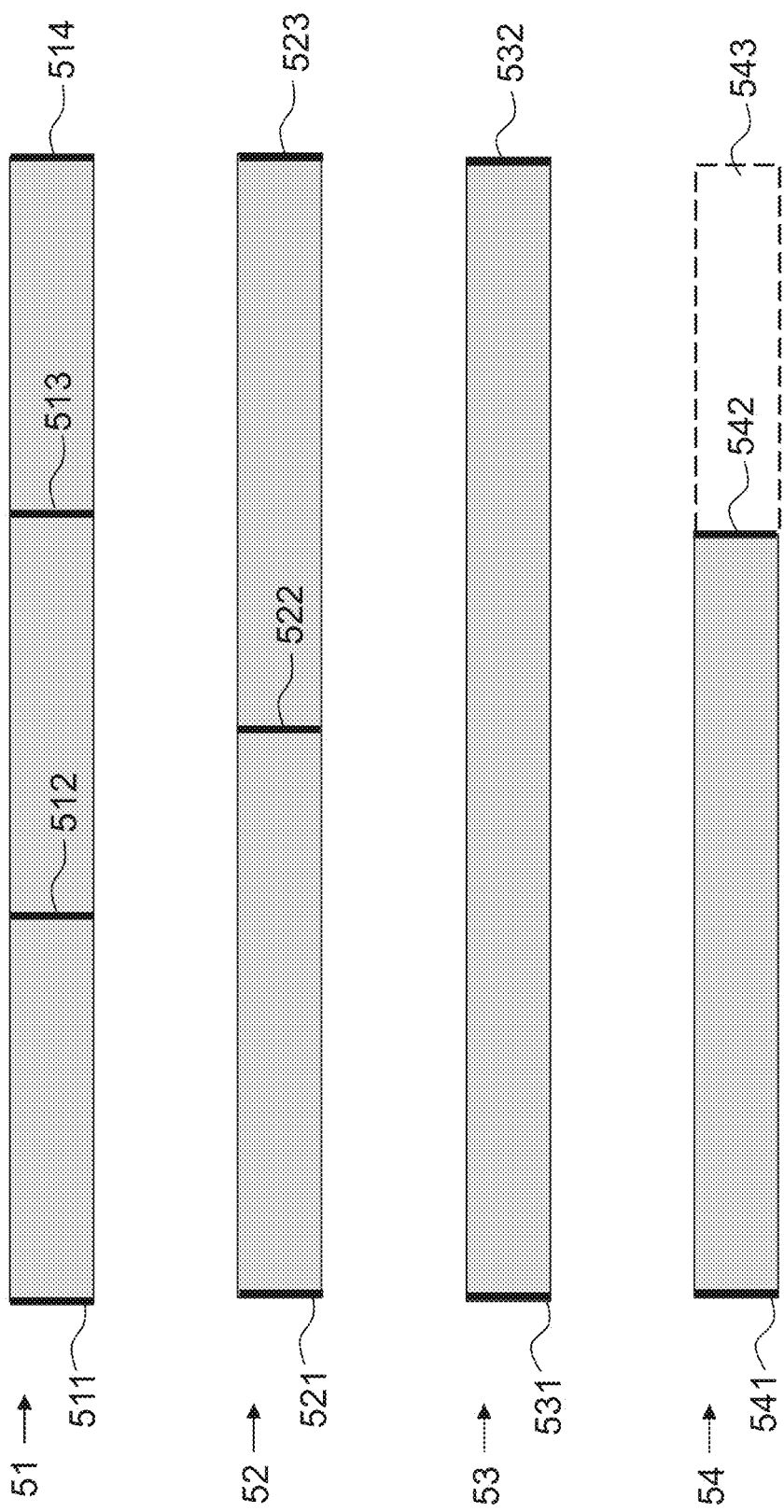
FIG. 5A is a schematic diagram of alignment positions for print media on the media support plane.

FIG. 5A schematically shows examples of table layouts of the media support plane 4 provided with guiding bars according to the present invention.

A first table layout 51 comprises 4 alignment bars, i.e. one alignment bar 511 at a left side of the table, one alignment bar 512 at one third of the table, one alignment bar 513 at two third of the table and one alignment bar 514 at a right side of the table. The first table layout 51 results in at most 6 lanes. Three lanes may be used to left align print media and the other three lanes may be used to right align print media.

A second table layout 52 comprises 3 alignment bars, i.e. one alignment bar 521 at a left side of the table, one alignment bar 522 halfway of the table and one alignment bar 523 at a right side of the table. The second table layout 52 results in at most 4 lanes. By adding the alignment bar 522 in the middle the operator can use for example two lanes or 4 lanes. However, the operator is free to use each of the available free lanes.

A third table layout 53 comprises 2 alignment bars, i.e. one alignment bar 531 at a left side of the table and one alignment bar 532 at a right side of the table. The third table layout results in at most 2 lanes. The operator can use one or two lanes depending on the size of the rigids.

A fourth table layout 54 also comprises 2 alignment bars, i.e. one alignment bar 541 at a left side of the table and one alignment bar 542 at two third of the table, wherein the remaining one third 543 of the table is not used. The fourth table layout 54 results in at most 2 lanes. By positioning the alignment bar at a position of $\frac{2}{3}^{rd}$ of the medium support plane only a part of the medium support plane at the left side of the alignment bar is used. This will already result in a higher productivity which can even be increased by disabling the right aligned lane, for example if two rigid boards do not fit next to each other.

At the third table layout 53 or the fourth table layout 54 the operator is free to use each of the available lanes, but he may have his preferences. For example, if a pile of rigids to be loaded is positioned at the left side of the printer 1 he may have a preference to load more rigids in the lane at the left side of the printer, i.e. in the left lane.

Figure 5B:
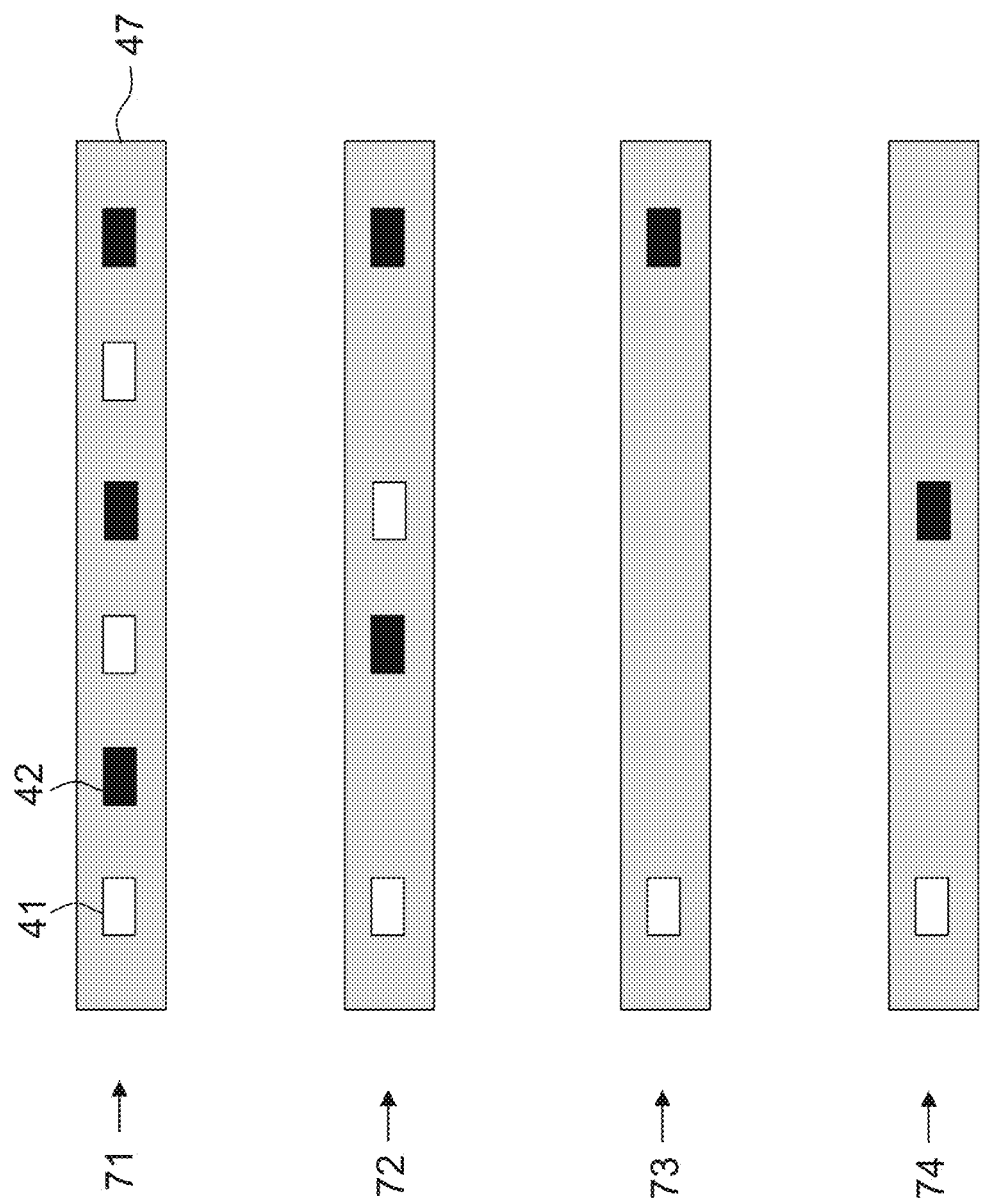
FIG. 5B is a schematic diagram of signaling layouts of the signaling objects according to the present invention.

FIG. 5B schematically shows a front side of the housing 47 comprising the signaling objects 40. FIG. 5C shows examples of signaling layouts 71-74 of the signaling objects 41, 42 above the media support plane 4 according to the present invention.

The layouts 71-74 correspond to the table layouts 51-54 in FIG. 5A respectively, wherein each lane is enabled and not blocked.

The signaling objects 41 which are colored white in FIG. 5B represent signaling objects for lanes in which the print media need to be left aligned along a corresponding alignment bar. The signaling objects 42 which are colored black in FIG. 5B represent signaling objects for lanes in which the print media need to be right aligned along a corresponding alignment bar.

When a current job needs left aligned print media the signaling objects which are colored white will be activated. When a current job needs right aligned print media the signaling objects which are colored black will be activated.

The planning of feeding of a print medium in the printer may be directly derived from the print job order sequence in the two print queues of the printer 1, where each print job indicates sizes of the at least one image to be printed on the print media. The print controller 12 keeps track of the completed images, the currently being printed images and the images to be scheduled for printing. A next print job to be printed may have a deviating setting which influences the printing and also the feeding of print medium upon which the next print job is going to be printed. Due to the deviating setting beforehand the print controller can control the signaling objects 40 to indicate which lanes are free for feeding print media by the operator for the next print job, i.e. the lanes that are not blocked. Before feeding the print media into the medium support plane, the operator has to define and acknowledge by means of a system setting of the printer 1 the size of the print media to be fed at the start of a print job. Thus the printer 1 knows the size, e.g. the width and the length of the print medium used for printing the images of the print job.

In some situations the print controller 12 may even temporarily block one of the print queues as mentioned before.

Figure 6:
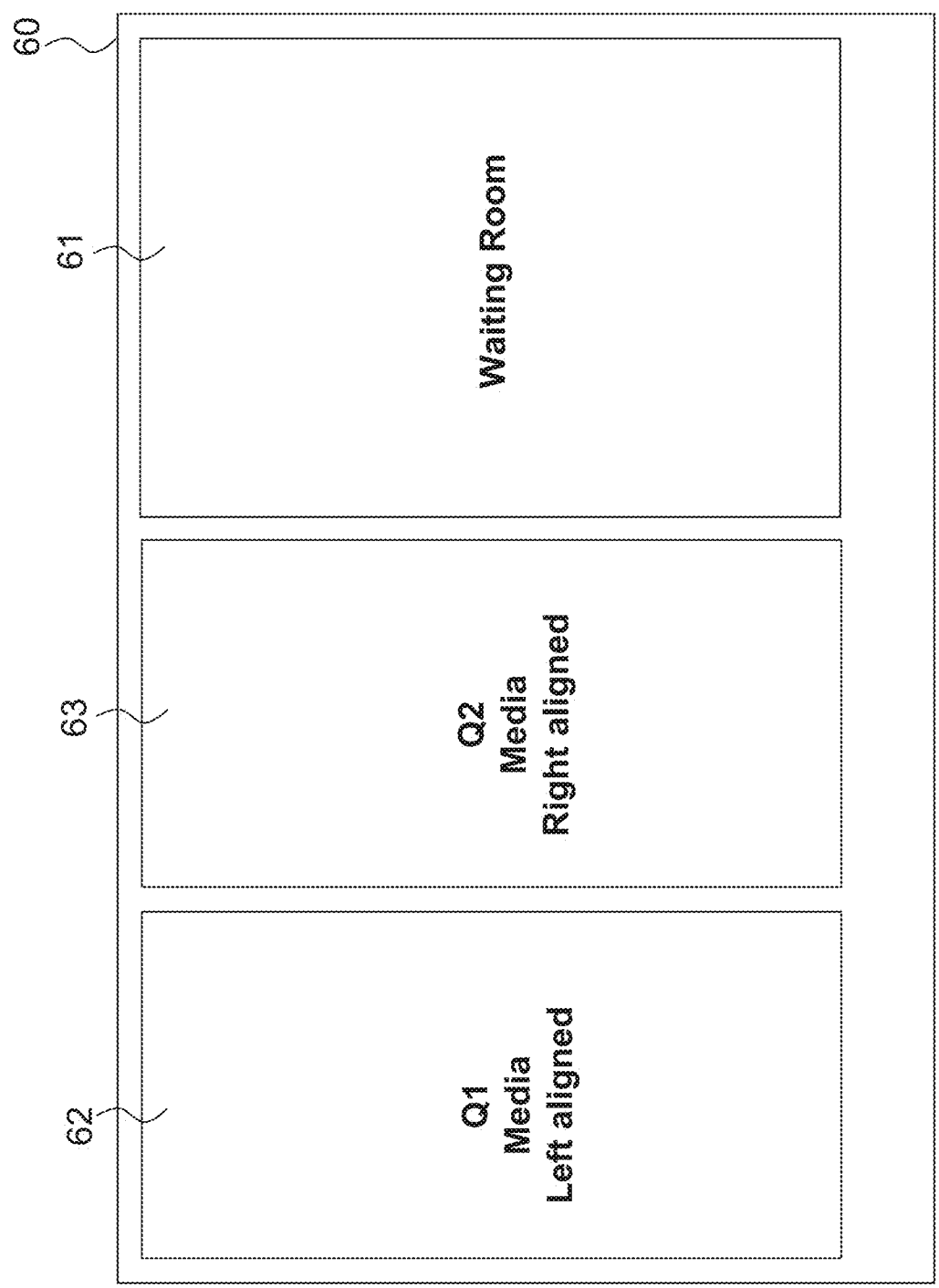
FIG. 6 shows a schematic diagram of a user interface screen according to the present invention.

FIG. 6 shows a schematic user interface screen 60 according to the present invention. In a first window 61 a waiting room is depicted in which images of print jobs are received when submitted to the printer 1. In a second window 62 the first print queue for images to be printed on left aligned print media is listed. In a third window 63 the second print queue for images to be printed on left aligned print media is listed. An image in the waiting room in the first window 61 may be selected and, moved or copied to the second window 62 or the third window 63. Action buttons (not shown) may be provided at the user interface screen 60 to move or copy a selected image from the waiting room to the second window 62 or the third window 63. The user interface screen may be a touch sensitive screen which enables dragging of an image from the waiting room to the second window 62 or the third window 63.

The digital images submitted to the printer 1 may also be automatically placed in on of the printing queues in the second window 62 or the third window 63. Namely, the digital image to be printed may be comprised in a print job having a plurality of print job attributes comprising a print job attribute for a required alignment. The print job attribute may be a left alignment, a right alignment or a "don't care" alignment. The print controller 12 may read out the print job attribute from the print job and automatically place the digital image of the print job in the first print queue in the second window 62 in case of a required left alignment or in the second print queue in the third window 63 in case of a required right alignment. In case of a "don't care" alignment, the digital image may arbitrarily be placed in one of the two print queues or for example in the print queue which is shortest in planned time for the images which are already placed in said print queue. When an image is dragged, copied and/or moved into a print queue the print job attribute for alignment in the print job is automatically changed in accordance with the print queue, if necessary. For example, when the image is dragged in another queue than prescribed by the print job attribute for alignment, said attribute is changed.

Figure 7A:
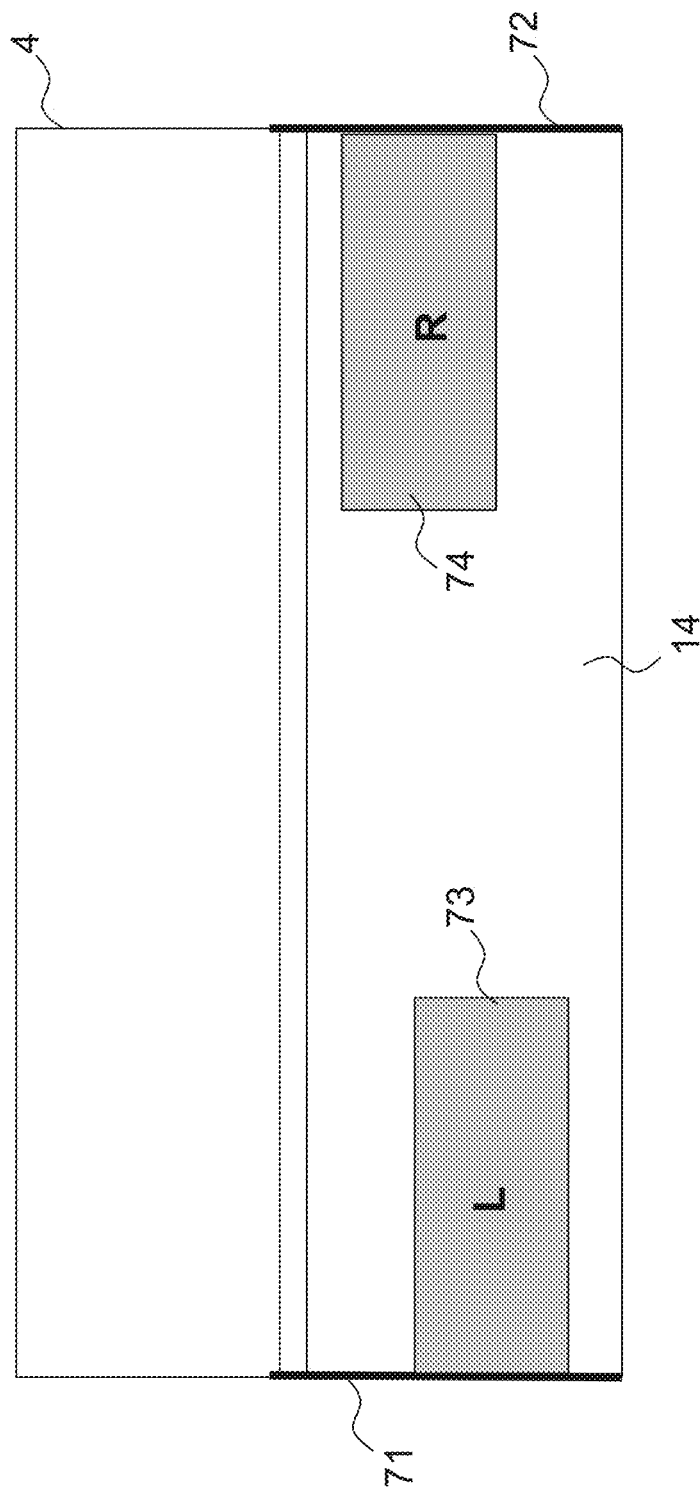
FIGS. 7A-7C are schematic top views of the printer with table layouts shown in FIG. 5A.

FIG. 7A shows a schematic top view of the printer 1 with belt 4 and media support unit 14. In this example two alignment bars 71, 72 are positioned on the media support unit 14 which extend towards the belt 4. This example is according to the table layout 53 shown in FIG. 5A. A first alignment bar 71 is positioned on the left side of the media support unit 14. A second alignment bar 72 is positioned on the right side of the media support unit 14. Images in the print queue of the second window 62 in FIG. 6 are printed on media 73 which is left aligned. Images in the print queue of the third window 63 in FIG. 6 are printed on media 74 which is right aligned.

The same concept as depicted in FIG. 7A may be applied with additional alignment bars and by doing so using multiple lanes per print queue.

Figure 7B:
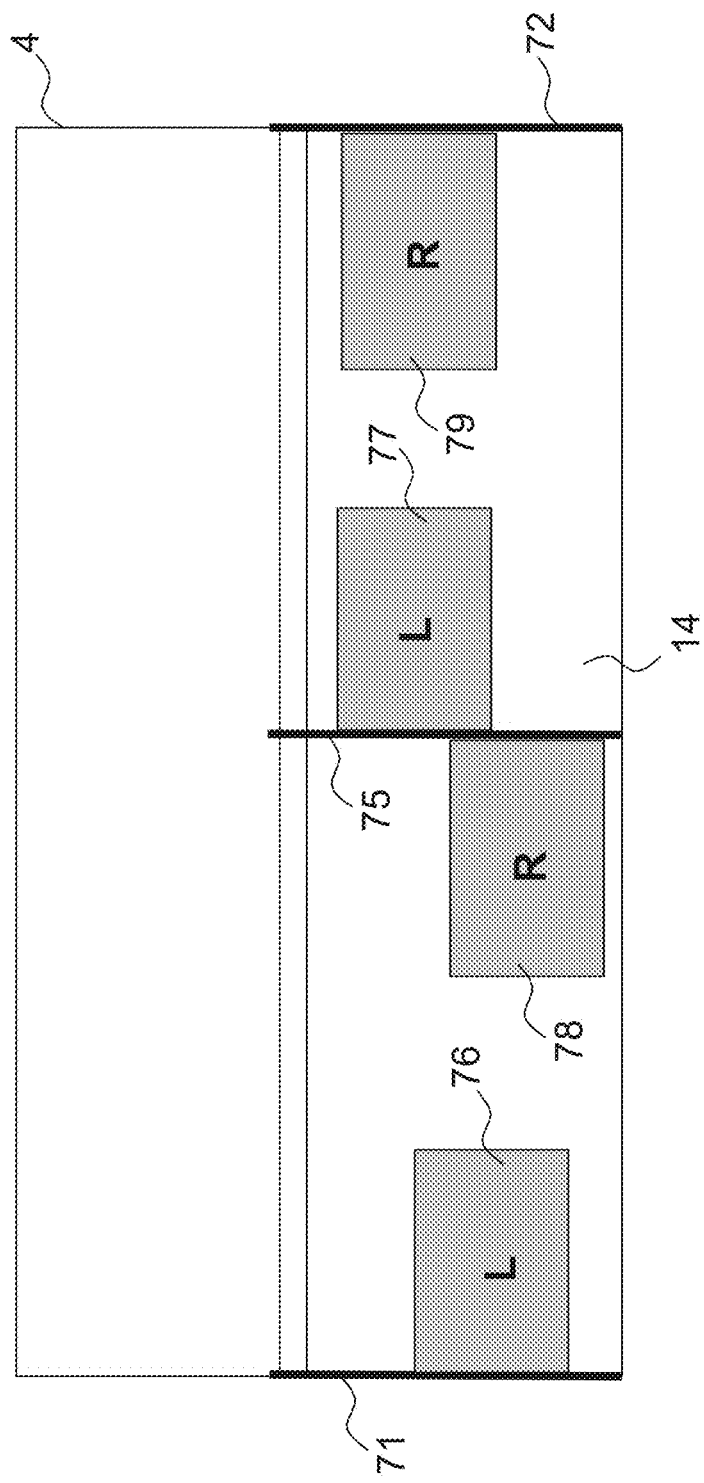

For example FIG. 7B shows an example according to table layout 52 shown in FIG. 5A. An additional alignment bar 75 is positioned in the middle of the media support unit 14. By adding the additional alignment bar 75 the operator may use two lanes or 4 lanes. In two lanes left aligned media 76, 77 may be fed. In the other two lanes right aligned media 78, 79 may be fed. Images in the print queue of the second window 62 in FIG. 6 are printed on media pieces 76, 77 which are left aligned. Images in the print queue of the third window 63 in FIG. 6 are printed on media pieces 78, 79 which are right aligned.

Figure 7C:
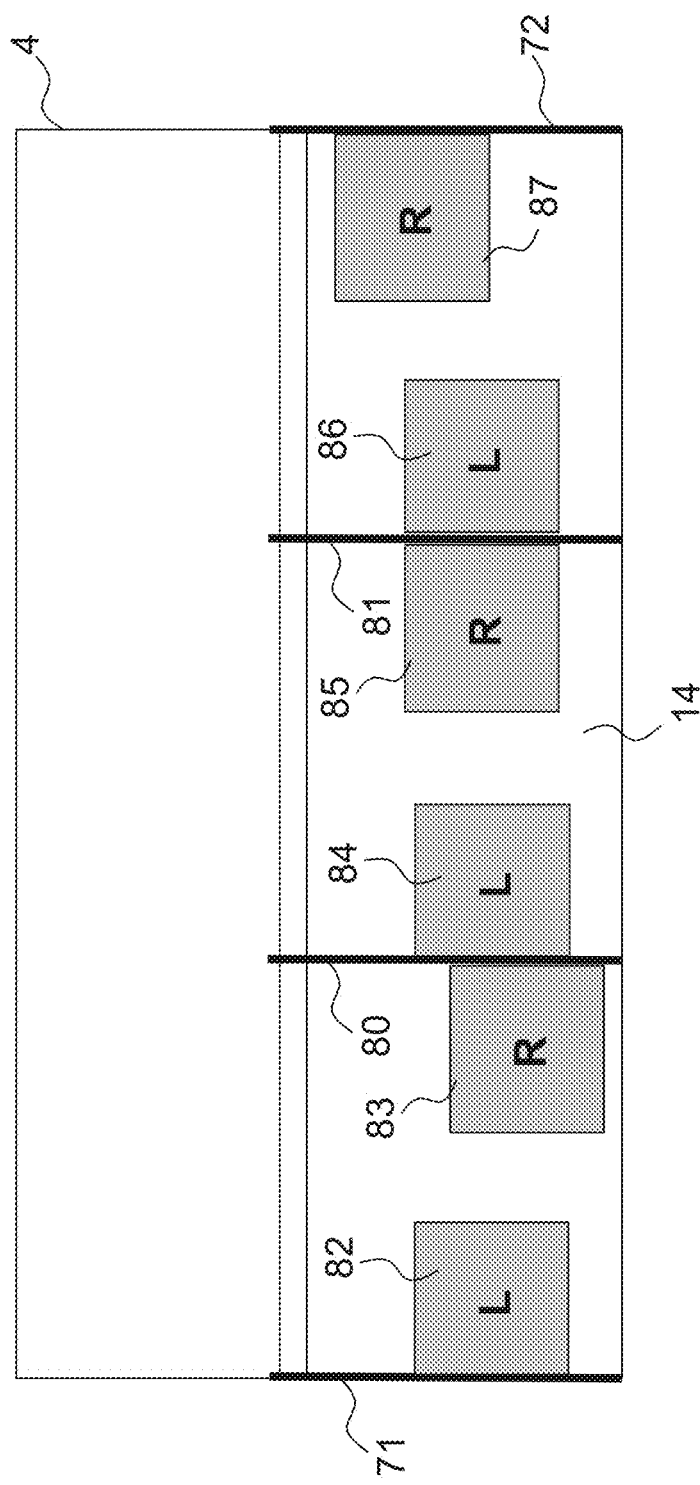

For example FIG. 7C shows an example according to table layout 51 shown in FIG. 5A. Two additional alignment bars 80, 81 is positioned on one third and two thirds respectively of the media support unit 14. By adding the additional alignment bars 80, 81 the operator may use up to 6 lanes. In three lanes left aligned media 82, 84, 86 may be fed. In the other three lanes right aligned media 83, 85, 87 may be fed. Images in the print queue of the second window 62 in FIG. 6 are printed on media pieces 82, 84, 86 which are left aligned. Images in the print queue of the third window 63 in FIG. 6 are printed on media pieces 83, 85, 87 which are right aligned.

The operator will be able to use the concepts as shown in FIGS. 7A-7C without having a need to split jobs over multiple queues in order to use multiple lanes. In the basic configuration (without additional guiding bars) as shown in FIG. 7A one or two lanes may be used depending on the size of the rigids. By adding a bar in the middle he can use two lanes or 4 lanes as shown in FIG. 7B. However the operator is always free to use each of the available free lanes. If the pile of rigids to be loaded is positioned at the left side the operator may have a preference to load more rigids in the lanes at the left side of the printer.

FIG. 8 discloses an example of a method according to the invention.

The first method starts in a starting point A which leads to a first step S1.

In the first step S1 the print controller receives a print job or an image to be printed. A print job may comprise multiple digital images.

In a second step S2 a kind of alignment is established. The establishment may be directly derived from reading a print job attribute of the print job comprising the digital image to be printed. The establishment may also be a mental act of the operator who has to distribute the images in the two queues. The kind of alignment may be a left alignment or a right alignment.

In a third step S3 it is checked of the established alignment is a left alignment. If so, the method proceeds to a fourth step S4. If the established alignment is a right alignment, the method proceeds to a fifth step S5.

In the fourth step S4 the image is added to the first queue for left aligned media.

In the fifth step S5 the image is added to the second queue for right aligned media.

The method may be simplified by bypassing the steps S2 and S3 and in the fourth step S4 and fifth step S5 step comprise the sub-step of moving or copying the image from the waiting room 61 shown in FIG. 6 to the second window 62 or the third window 63 respectively for left respectively right aligned media.

In a sixth step S6 the image is printed on the left aligned media.

In a seventh step S7 the image is printed on the right aligned media.

The method ends in an end point B.

FIG. 9 schematically shows a non-transitory software medium 90 according to the invention. The software medium 90 comprises executable code 92 configured to, when executed, perform the method according to the invention, e.g. as described with respect to either the printing system 1 shown in FIG. 1 or the method of controlling the printing system 1 according to the present invention and/or according to any of the variants and modifications of the printing system 1 and/or of the method described herein.

The non-transitory software medium 90 may, specifically, be formed as a CD or a CD-ROM, a DVD or a DVD-ROM, a BluRay disc or a BluRay-ROM disc, a magnetic hard drive, a solid state disk (SSD) hard drive, a USB memory device and so on.

Although specific embodiments of the invention are illustrated and described herein, it will be appreciated by those of ordinary skill in the art that a variety of alternate and/or equivalent implementations exist. It should be appreciated that the exemplary embodiment or exemplary embodiments are examples only and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

It will also be appreciated that in this document the terms "comprise", "comprising", "include", "including", "contain", "containing", "have", "having", and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for a printer comprising a transport device comprising an endless transport belt supported on a pair of support rollers, a medium support plane being defined between the pair of support rollers, a print station being provided over the medium support plane, wherein the method comprises the steps of:

transporting in parallel a plurality of individual print media perpendicular to a scanning direction of the print station on the medium support plane, the print media having different dimensions;

determining positions of the individual print media; and based on the determined positions, jetting marking material for forming a designated image specific for each print medium on each respective print medium, wherein the above steps are repeated such that print media are printed in a plurality of parallel lanes on the medium support plane perpendicular to the scanning direction, wherein the printer is provided with a plurality of guiding bars extending in the transport direction and positioned at a side of at least one lane of the plurality of parallel lanes in order to guide the individual print media into one of the plurality of parallel lanes, wherein the printer comprises a print controller for controlling the print process for a digital image to be printed, the print controller comprising two print queues for receiving digital images to be printed by the printer, and wherein the method further comprises the steps of:

establishing if the digital image requires to be right aligned or left aligned along a guiding bar;

in case of a required left alignment, adding the digital image to a first print queue of the two print queues; and in case of a required right alignment, adding the digital image to a second print queue of the two print queues.

2. The method according to claim 1, wherein the method comprises the steps of:

in case of a presence of the digital image in the first queue, receiving print media which is left aligned along a guiding bar and printing the digital image on left aligned print media; and in case of a presence of the digital image in the second queue, receiving print media which is right aligned along a guiding bar and printing the digital image on right aligned print media.

3. The method according to claim 1, wherein the printer comprises above each lane a signaling object which is activated when the corresponding lane is enabled to receive print media, and the method comprises the steps of:

determining if the next image to be printed resides in the first queue or in the second queue;

in case of a residence in the first queue, activating the signaling object of each lane for which the print media requires to be left aligned and deactivating the signaling object of each lane for which the print media requires to be right aligned; and in case of a residence in the second queue, activating the signaling object of each lane for which the print media requires to be right aligned and deactivating the signaling object of each lane for which the print media requires to be left aligned.

4. The method according to claim 1, wherein the digital image to be printed is comprised in a print job having a plurality of print job attributes comprising a print job attribute for a required alignment, and the step of establishing if the digital image requires to be right aligned or left aligned along a guiding bar, comprises the sub-step of taking the print job attribute for the required alignment into account.

5. The method according to claim 1, wherein the printer comprises a user interface and the method comprises the step of displaying the two queues on a screen of the user interface.

6. The method according to claim 5, wherein the user interface comprises a waiting room comprising images to be selected for printing, and the method comprises the steps of selecting an image in the waiting room and moving or copying the selected image to one of the two queues on the screen of the user interface.

7. The method according to claim 1, wherein the method comprises the step of blocking one of the queues due to at least one print situation out of a group of print situations comprising a first situation that a rigid is broader than a lane width, a second situation having images to be printed with different print modes, a third situation of the introduction of new print media and a fourth situation of having print media of different thicknesses.

8. A printer comprising a transport device comprising an endless transport belt supported on a pair of support rollers, a medium support plane being defined between the pair of support rollers, a print station being provided over the medium support plane, wherein the printer is provided with a plurality of guiding bars extending in the transport direction and positioned at a side of at least one lane of the plurality of parallel lanes in order to guide the individual print media into one of the plurality of parallel lanes, wherein the printer comprises a print controller for controlling the print process for digital images to be printed by means of two print queues for receiving digital images to be printed by the printer, and wherein the print controller is configured to execute the steps of the method according to claim 1.

9. The printer according to claim 8, wherein the printer comprises above each lane a signaling object which is activated when the corresponding lane is enabled to receive print media, and the print controller is configured to execute the steps of:

determining if the next image to be printed resides in the first queue or in the second queue;

in case of a residence in the first queue, activating the signaling object of each lane for which the print media requires to be left aligned and deactivating the signaling object of each lane for which the print media requires to be right aligned; and in case of a residence in the second queue, activating the signaling object of each lane for which the print media requires to be right aligned and deactivating the signaling object of each lane for which the print media requires to be left aligned.

10. The printer according to claim 8, wherein the printer comprises a user interface for displaying the two print queues comprising digital images to be printed by the printer.

11. The printer according to claim 8, wherein the printer is a hybrid printer for printing on rigid print media as well as on flexible print media.

12. A software product comprising program code on a non-transitory machine-readable medium, which program code, when loaded into a print controller of a digital printer, causes the print controller to execute the steps of the method according to claim 1.

* * * * *